United States Patent
Huang

(10) Patent No.: US 9,025,325 B2
(45) Date of Patent: May 5, 2015

(54) HARD DISK DRIVE CASE MOUNTING STRUCTURE

(71) Applicant: Brimo Technology, Inc., Taipei (TW)

(72) Inventor: Chi-Hsien Huang, Taipei (TW)

(73) Assignee: Brimo Technology, Inc., Taipei (TW)

( * ) Notice: Subject to any disclaimer, the term of this patent is extended or adjusted under 35 U.S.C. 154(b) by 213 days.

(21) Appl. No.: 13/899,046

(22) Filed: May 21, 2013

(65) Prior Publication Data

US 2014/0347810 A1 Nov. 27, 2014

(51) Int. Cl.
  *G06F 1/16* (2006.01)
  *G06F 1/18* (2006.01)

(52) U.S. Cl.
  CPC ....................................... *G06F 1/187* (2013.01)

(58) Field of Classification Search
  USPC ................ 312/223.2, 223.1, 265.5, 333, 236,
          312/332.1; 361/679.33, 679.47, 679.01,
          361/679.48, 679.35, 679.34, 679.31,
          361/679.41, 679.37, 679.43, 679.32,
          361/679.59, 679.58, 679.02, 679.08;
          345/1.2, 76, 179, 156, 581, 55, 173,
        345/157, 158, 168; 211/26, 134, 184, 188,
          211/41.11; 455/412.2, 414.1, 557, 556.2,
          455/575.3, 421; 165/104.14, 185, 80.2,
          165/3.06, 80.4, 104.33; 360/256.4, 99.12,
          360/97.17, 99.13, 137, 97.2, 323, 133, 75,
          360/244

See application file for complete search history.

(56) References Cited

U.S. PATENT DOCUMENTS

| | | | | |
|---|---|---|---|---|
| 7,719,834 | B2 * | 5/2010 | Miyamoto et al. | 361/695 |
| 2004/0037035 | A1 * | 2/2004 | Ohashi et al. | 361/687 |
| 2008/0310095 | A1 * | 12/2008 | Chiang et al. | 361/685 |

\* cited by examiner

*Primary Examiner* — Hung Duong
(74) *Attorney, Agent, or Firm* — Muncy, Geissler, Olds & Lowe, P.C.

(57) ABSTRACT

A hard disk drive case mounting structure includes a case formed of a top cover shell and a bottom holder shell, an electronic system accommodated in the case, and fasteners each including a female fastening component having an annular head press-fitted in one respective vertical mounting hole at the top cover shell of the case and a split tube-like mating connection socket downwardly extended from the annular head, and a male fastening component having a flat circular head press-fitted into one respective vertical mounting hole at the bottom holder shell of the case and a retaining shank extended from the flat circular head and inserted through one respective mounting through hole at a flat frame member of the electronic system and then fastened to the split tube-like mating connection socket of the female fastening component by means of a hook block.

7 Claims, 6 Drawing Sheets

HARD DISK DRIVE CASE MOUNTING STRUCTURE

BACKGROUND OF THE INVENTION

1. Field of the Invention

The present invention relates to hard disk drive mounting technology and more particularly, to a hard disk drive case mounting structure, which uses fasteners each formed of a male fastening component and a female fastening component to fasten a top cover shell and a bottom holder shell of a case together, holding an electronic system firmly in the case against vibration and displacement.

2. Description of the Related Art

Following fast development of electronic technology, computers, notebook computers, tablet computers and many other small mobile electronic devices have been well developed and widely used for different applications. Further, it is the market trend to create electronic devices having light, thin, short and small characteristics with high operating speed and expanded functions. In consequence, an advanced electronic device requires a large capacity hard disk drive for storing more data. A regular electronic product is simply equipped with one or two hard disk drives. If the data storage capacity of an electronic product is insufficient, the user may have to expand the data storage capacity of the hard disk drive or to attach external hard disk drives to the electronic product.

Following development of disk drive technology, solid-state drive (SSD), flash memory, and synchronous dynamic random access memory (SDRAM) are created. In an HDD, there are constantly spinning discs that read and write data magnetically. In an SSD, the memory does not move. SSDs, instead, use a motionless technology called NAND flash memory to read and write. A computer takes a lot less time to hunt and gather data from an SSD because it is able to find data just as quickly. When compared to conventional hard disk drives, a solid-state drive (SSD) has the advantages of low power consumption, low noise level, shock resistance, and low heat. It stores data more safely, and prolongs the battery operating time of a notebook computer. Therefore, solid-state drives are intensively used in notebook computers to substitute for conventional hard disk drives.

However, when mounting a solid-state drive in a hard disk drive case, screws are driven by a hand tool (screwdriver or wrench) to affix the bottom holder shell and top cover shell of the case and the solid-state drive together. This installation procedure requires much labor and installation time. Further, because screws are small components, they can easily get lost during installation. Further, if the screws are not held in accurate alignment with the screw holes in the top cover shell and bottom holder shell of the hard disk drive case during installation, the mounting operation will become difficult to complete, wasting much labor and time and leading to increased production cost.

SUMMARY OF THE INVENTION

The present invention has been accomplished under the circumstances in view. It is therefore the main object of the present invention to provide a hard disk drive case mounting structure, which facilitates quick installation without a tool, shortens the installation time, saves the manufacturing cost and improves the yield.

To achieve this and other objects of the present invention, a hard disk drive case mounting structure in accordance with the present invention comprises a case formed of a top cover shell and a bottom holder shell and defining therein an accommodation chamber, an electronic system accommodated in the accommodation chamber inside the case, and fasteners mounted in respective vertical mounting holes at the top cover shell and bottom holder shell of the case and respective mounting through holes at the electronic system to affix the top cover shell and bottom holder shell of the case and the electronic system firmly together.

Further, each fastener comprises a female fastening component mounted in one respective vertical mounting hole at the top cover shell of the case, and a male fastening component mounted in one respective vertical mounting hole at the bottom holder shell of the case and inserted through one respective mounting through hole at the flat frame member of the electronic system and then fastened to the female fastening component to secure the top cover shell, the electronic system and the bottom holder shell firmly together. Further, the male fastening components and female fastening components of the fasteners can be selectively made of rubber, plastics, silicon rubber, or metal.

DETAILED DESCRIPTION OF THE PREFERRED EMBODIMENT

Figure 1:
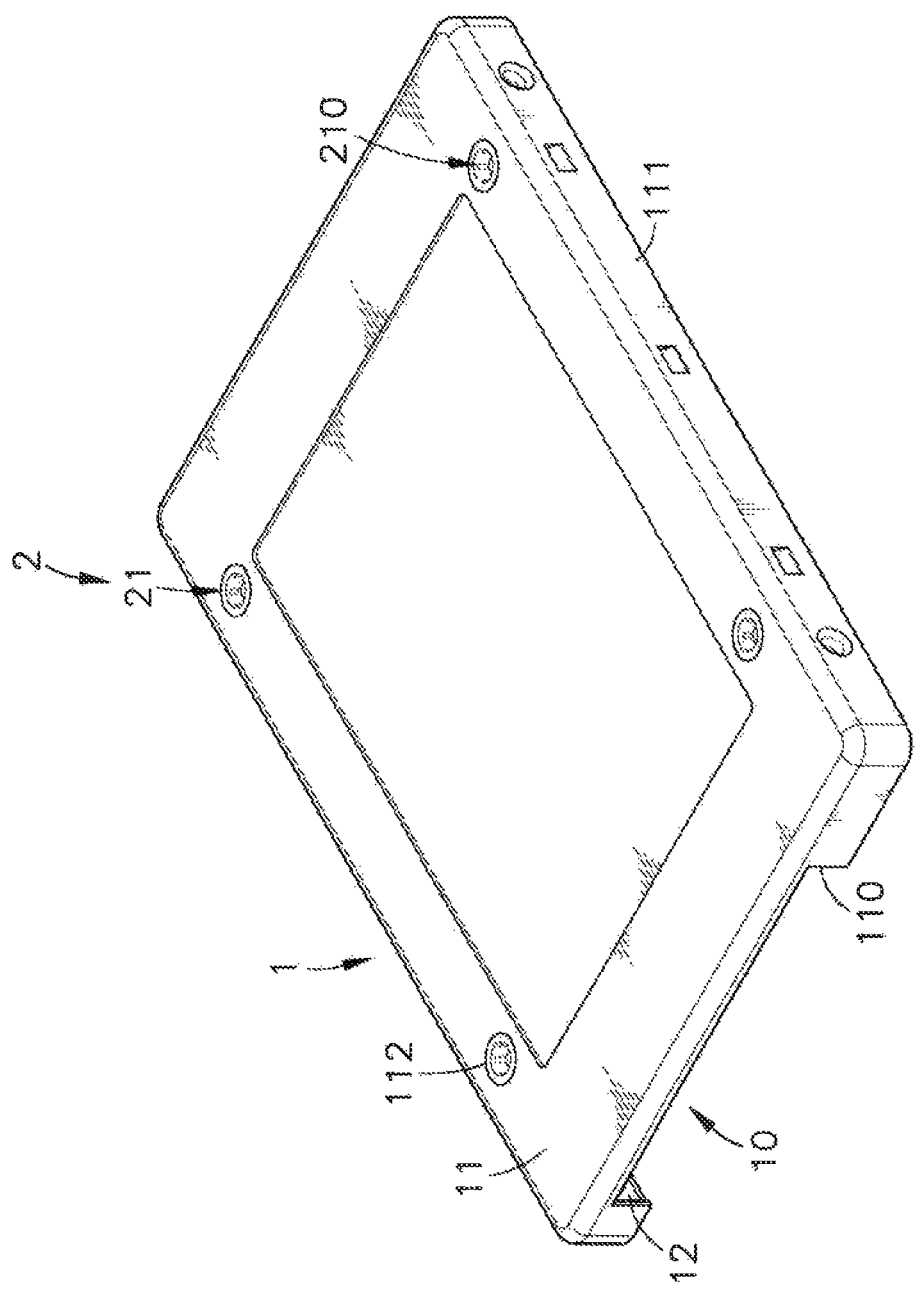
FIG. 1 is an oblique top elevation of a hard disk drive case mounting structure in accordance with the present invention.
Figure 2:
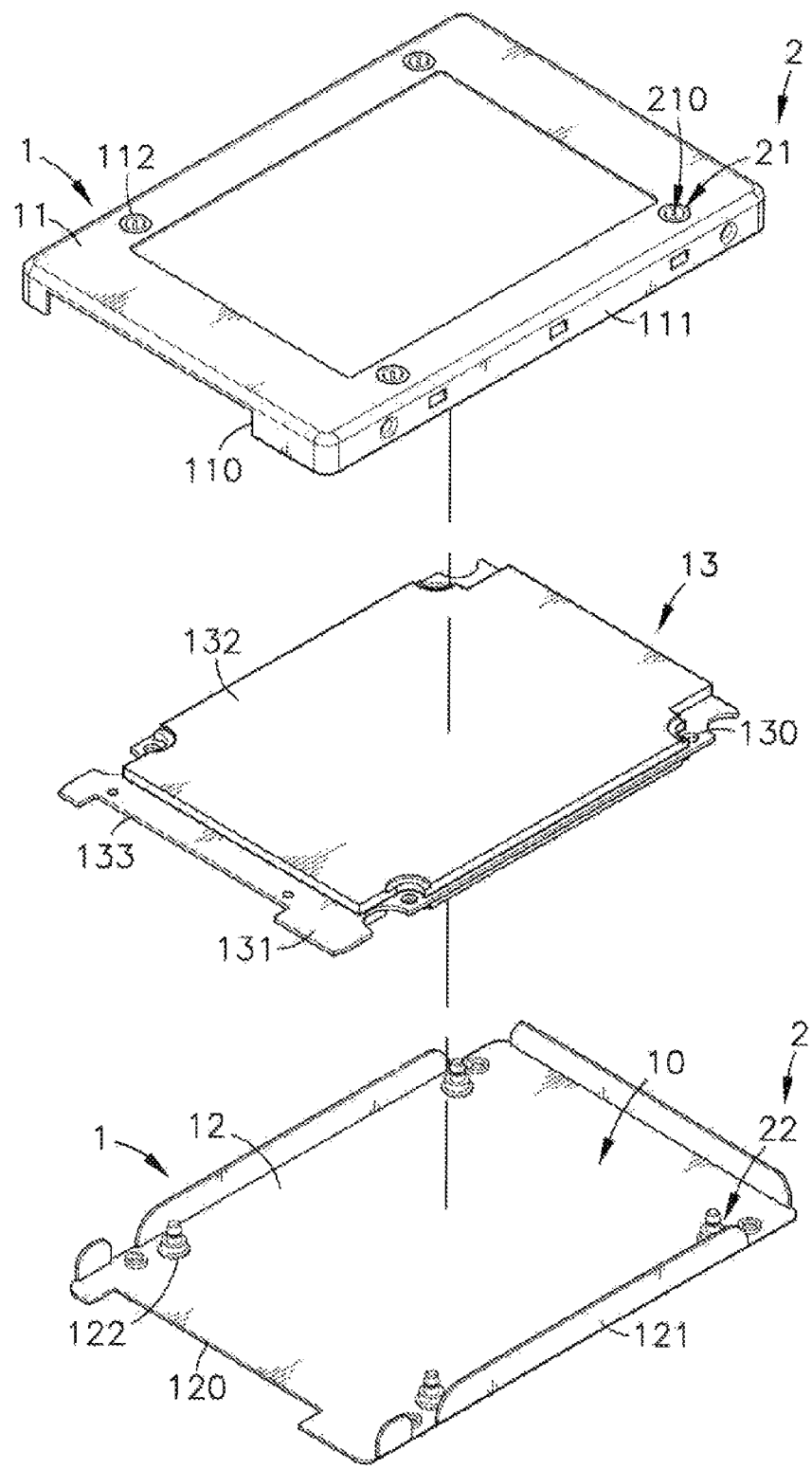
FIG. 2 is an exploded view of the hard disk drive case mounting structure in accordance with the present invention.
Figure 3:
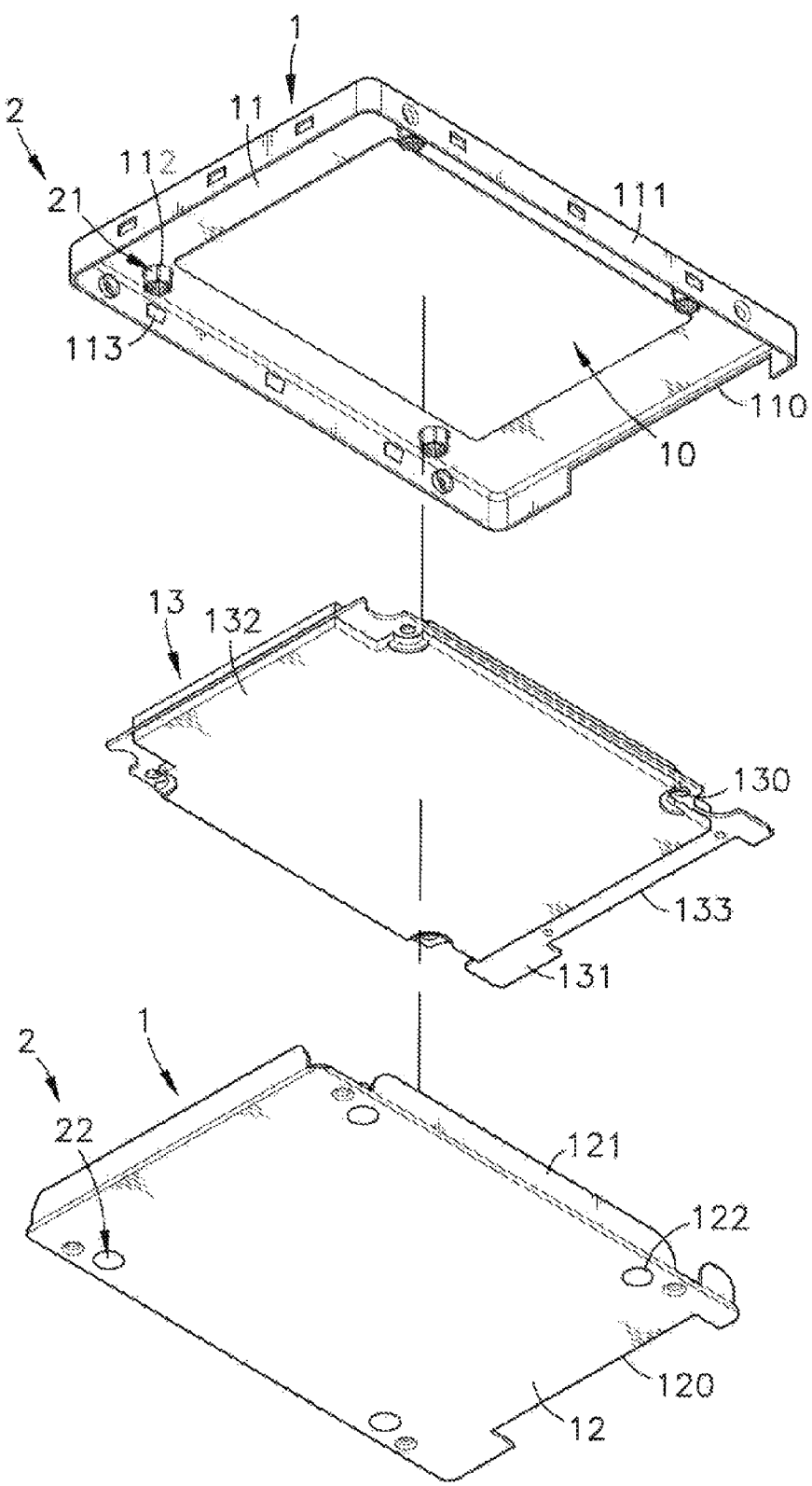
FIG. 3 corresponds to FIG. 2 when viewed from another angle.
Figure 4:
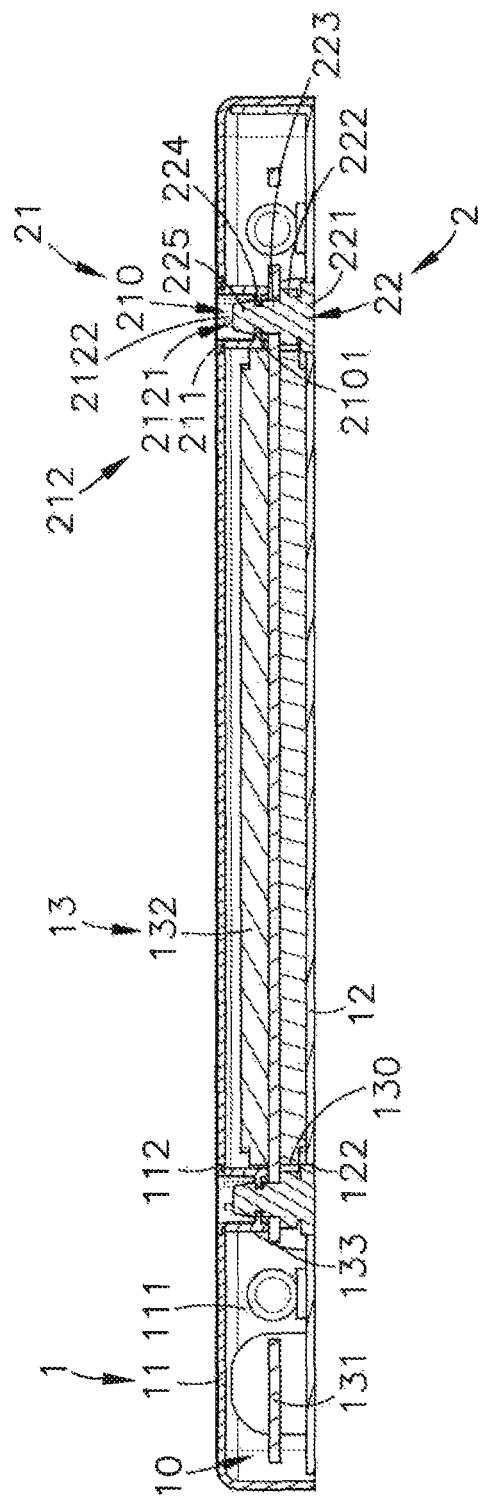
FIG. 4 is a sectional side view of the hard disk drive case mounting structure in accordance with the present invention.

Referring to FIGS. 1-4, a hard disk drive case mounting structure in accordance with the present invention is shown. The hard disk drive case mounting structure comprises a case 1 adapted to hold an electronic system 13 therein, and a set of fasteners 2 fastenable to the case 1 to fixedly secure the case 1 and the accommodated electronic system 13 together.

The case 1 comprises a top cover shell 11 and a bottom holder shell 12. The top cover shell 11 is a rectangular shell having a plurality of vertical mounting holes 112 symmetrically disposed near two opposite lateral sides thereof, an opening 110 defined in one of four vertical peripheral sides thereof, and three vertical peripheral walls 111 respectively and downwardly disposed in the other three peripheral sides. The bottom holder shell 12 is a rectangular shell having a plurality of vertical mounting holes 122 symmetrically disposed near two opposite lateral sides thereof corresponding to the vertical mounting holes 112 of the top cover shell 11, three vertical peripheral walls 121 respectively and upwardly disposed in three of four peripheral sides thereof for abutting against respective inner surfaces of the vertical peripheral walls 111 of the top cover shell 11, and an opening 120 defined in the other peripheral side corresponding to the opening 110 of the top cover shell 11. Further, when the top cover shell 11 and the bottom holder shell 12 are fastened together to form the case 1, an accommodation chamber 10 is defined in the case 1 for accommodating the electronic system 13. Further, the electronic system 13 comprises a flat frame member 131, and a plurality of data memories 132 mounted at opposing top and bottom sides of the flat frame member 131. The flat frame member 131 has a plurality of mounting through holes 130 symmetrically disposed at two opposite lateral sides outside the data memories 132 and corresponding to the vertical mounting holes 112 of the top cover shell 11 and the vertical mounting holes 122 of the bottom holder shell 12, and a mounting notch 133 at a front side thereof corresponding to the opening 110 of the top cover shell 11 and the opening 120 of the bottom holder shell 12 for the mounting of a predetermined electrical connector. Further, the vertical mounting holes 112 of the top cover shell 11 and the vertical mounting holes 122 of the bottom holder shell 12 are preferably countersunk holes.

The fasteners 2 are fastenable to the vertical mounting holes 112 of the top cover shell 11, the mounting through holes 130 of the flat frame member 131 of the electronic system 13 and the vertical mounting holes 122 of the bottom holder shell 12 to fixedly secure the case 1 and the accommodated electronic system 13 together, each comprising a female fastening component 21 and a male fastening component 22. The female fastening component 21 comprises an annular head 211 and a split tube-like mating connection socket 212 perpendicularly extended from one side of the annular head 211, an engagement hole 210 axially extending through the annular head 211 and the split tube-like mating connection socket 212. The split tube-like mating connection socket 212 comprises a plurality of longitudinal splits 2121 and a plurality of springy socket wall elements 2122 alternatively arranged around the engagement hole 210, a beveled inner bottom edge 2102 located at an inner bottom side of each of the springy socket wall elements 2122 remote from the annular head 211, a hook block 2101 perpendicularly extended from each of the springy socket wall elements 2122 and suspending in the engagement hole 210, and a locating groove 2103 defined between the beveled inner bottom edges 2102 and hook blocks 2101 of the springy socket wall elements 2122. Further, each two adjacent springy socket wall elements 2122 define with the annular head 211 a flat surface portion 2123 corresponding to the respective longitudinal split 2121. The male fastening component 22 comprises a flat circular head 221, a flat circular shoulder 222 concentrically raised from one side of the flat circular head 221, a retaining shank 223 concentrically and perpendicularly extended from one side of the flat circular shoulder 222 opposite to the flat circular head 221 and terminating in a tapered guide tip 225, and an annular retaining groove 224 extending around the periphery of the retaining shank 223.

During installation of the present invention, mount the female fastening components 21 and male fastening components 22 of the fasteners 2 in the vertical mounting holes 112 of the top cover shell 11 and the vertical mounting holes 122 of the bottom holder shell 12 respectively, and then place the electronic system 13 in the bottom holder shell 12 to attach the respective mounting through holes 130 of the electronic system 13 to the respective male fastening components 22 the vertical mounting holes 122 of the bottom holder shell 12, and then cover the top cover shell 11 to the bottom holder shell 12 to force the respective female fastening components 21 of the fasteners 2 in the vertical mounting holes 112 of the top cover shell 11 into engagement with the respective male fastening components 22, and thus, the case 1 is assembled to hold the electronic system 13 firmly inside.

Further, the top cover shell 11 comprises a plurality of friction blocks 113 located at respective inner surfaces of the vertical peripheral walls 111. When covering the top cover shell 11 on the bottom holder shell 12, the friction blocks 113 at the inner surfaces of the vertical peripheral walls 111 of the top cover shell 11 will be respectively abutted against the respective outer surfaces of the vertical peripheral walls 121 of the bottom holder shell 12. Alternatively, the vertical peripheral walls 121 of the bottom holder shell 12 can be configured for covering on the vertical peripheral walls 11 of the top cover shell 11, and friction blocks can be provided at respective inner surfaces of the vertical peripheral walls 121 of the bottom holder shell 12 for abutting against respective outer surfaces of the vertical peripheral walls 11 of the top cover shell 11.

Figure 5:
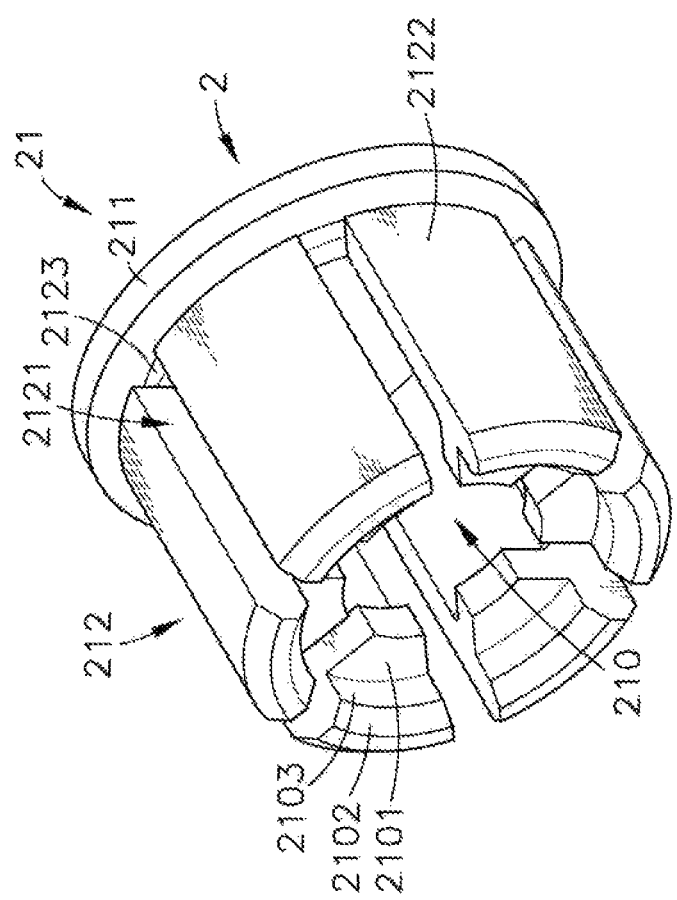
FIG. 5 is an oblique top elevation of a female fastening component in accordance with the present invention.
Figure 6:
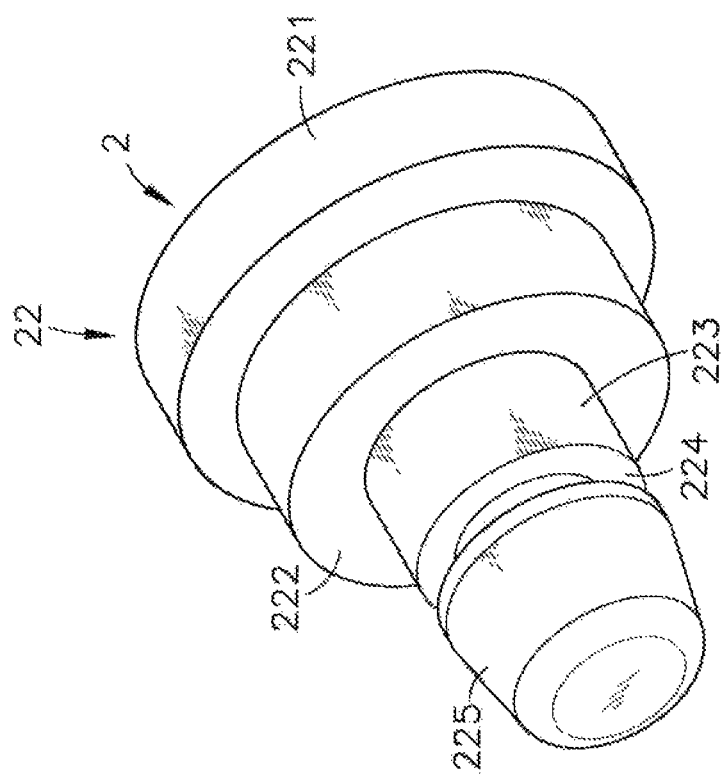
FIG. 6 is an oblique top elevation of a male fastening component in accordance with the present invention.

Referring to FIGS. 5 and 6 and FIGS. 2-4 again, the female fastening components 21 and male fastening components 22 of the fasteners 2 that are respectively mounted in the vertical mounting holes 112 of the top cover shell 11 and the vertical mounting holes 122 of the bottom holder shell 12 can be made of flexible rubber, plastics or silicon rubber, or rigid metal. Further, the diameter of the annular heads 211 of the fastening components 21 and the diameter of the flat circular heads 221 of the male fastening components 22 are respectively slightly larger than the diameter of the vertical mounting holes 112 of the top cover shell 11 and the diameter of the vertical mounting holes 122 of the bottom holder shell 12 so that the annular heads 211 of the female fastening components 21 and the flat circular heads 221 of the male fastening components 22 can be respectively press-fitted into the vertical mounting holes 112 of the top cover shell 11 and the vertical mounting holes 122 of the bottom holder shell 12. Further, during installation, the retaining shanks 223 of the male fastening components 22 are respectively inserted through the mounting through holes 130 of the flat frame member 131 of the electronic system 13 into the engagement hole 210 of the female fastening components 21 to force the respective annular retaining grooves 224 of the male fastening components 22 into engagement with the hook blocks 2101 of the female fastening components 21. Thus, the hard disk drive case mounting structure can easily and rapidly be assembled without a tool, shortening the installation time, saving the manufacturing cost and improving the yield.

Further, the matching design between the beveled inner bottom edges 2102 at the springy socket wall elements 2122 of each female fastening component 21 and the tapered guide tip 225 of each male fastening component 22, the retaining shanks 223 of the male fastening components 22 can be smoothly inserted into the engagement holes 210 of the respective female fastening components 21 to force the annular retaining grooves 224 of the male fastening components 22 into engagement with the hook blocks 2101 of the respective female fastening components 21, holding the flat frame member 131 of the electronic system 13 firmly between the female fastening components 21 and male fastening components 22 of the fasteners 2 against vibration and displacement.

Further, as an alternate form of the present invention, the aforesaid hook blocks 2101 can be formed on the retaining shanks 223 of the male fastening components 22, and the aforesaid annular retaining grooves 224 can be formed in the split tube-like mating connection sockets 212 of the female fastening components 21 for engagement with the hook blocks 2101.

As described above, the invention provides a hard disk drive case mounting structure, which comprises a case 1 formed of a top cover shell 11 and a bottom holder shell 12 and defining therein an accommodation chamber 10, an electronic system 13 accommodated in the accommodation chamber 10 inside the case 1, and fasteners 2 for fastening the top cover shell 11 and bottom holder shell 12 of the case 11 and the electronic system 13 firmly together, wherein each fastener 2 comprises a female fastening component 21 mounted in one respective vertical mounting hole 112 at the top cover shell 11 of the case 1, and a male fastening component 22 mounted in one respective vertical mounting hole 122 at the bottom holder shell 12 of the case 1 and inserted through one respective mounting through hole 130 at a flat frame member 131 of the electronic system 13 and then fastened to the female fastening component 21. This design of hard disk drive case mounting structure can easily and rapidly be assembled without a tool, shortening the installation time, saving the manufacturing cost and improving the yield.

In conclusion, the invention uses fasteners each formed of a male fastening component and a female fastening component to fasten the top cover shell and bottom holder shell of the case together, holding the electronic system firmly in the case. Using the fasteners to fasten the top cover shell and bottom holder shell of the case and the electronic system facilitates quick installation without a tool, shortens the installation time, saves the manufacturing cost and improves the yield.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A hard disk drive case mounting structure, comprising:
a case comprising a bottom holder shell, a top cover shell covering said bottom holder shell, and an accommodation chamber defined in between said bottom holder shell and said top cover shell, said bottom holder shell and said top cover shell each comprising a plurality of vertical mounting holes respectively symmetrically disposed near two opposite lateral sides thereof;
an electronic system accommodated in said accommodation chamber inside said case, said electronic system comprising a plurality of mounting through holes symmetrically disposed at two opposite lateral sides thereof corresponding to the vertical mounting holes of said bottom holder shell and said top cover shell of said case; and
a plurality of fasteners fastened to said vertical mounting holes of said bottom holder shell and said top cover shell of said case and said mounting through holes of said electronic system to fixedly secure said bottom holder shell and said top cover shell and said electronic system together, each said fastener comprising a female fastening component mounted in one said vertical mounting hole of said top cover shell and a male fastening component mounted in one said vertical mounting hole of said bottom holder shell and inserted through one said mounting through hole of said electronic system and fastened to said female fastening component, said female fastening component comprising an annular head press-fitted into one said vertical mounting hole of said top cover shell and a split tube-like mating connection socket perpendicularly extended from one side of said annular head, an engagement hole axially extending through said annular head and said split tube-like mating connection socket, said split tube-like mating connection socket comprising a plurality of longitudinal splits and a plurality of springy socket wall elements alternatively arranged around said engagement hole, a beveled inner bottom edge located at an inner bottom side of each said springy socket wall element remote from said annular head, and a locating groove defined therein adjacent to said beveled inner bottom edges, each two adjacent said springy socket wall elements defining with said annular head a flat surface portion corresponding to one respective said longitudinal split, said male fastening component comprising a flat circular head press-fitted into one said vertical mounting hole of said bottom holder shell, a flat circular shoulder concentrically raised from one side of said flat circular head, and a retaining shank concentrically and perpendicularly extended from one side of said flat circular shoulder opposite to said flat circular head and inserted through one said mounting through hole of said electronic system and guided by said beveled inner bottom edges into said engagement hole and said locating hole of said female fastening component.

2. The hard disk drive case mounting structure as claimed in claim 1, wherein said top cover shell further comprises an opening defined in one of four vertical peripheral sides thereof, three vertical peripheral walls respectively and downwardly disposed in the other three peripheral sides thereof, and a plurality of friction blocks respectively located at an inner surface of each of said three vertical peripheral walls of said top cover shell; said bottom holder shell comprises three vertical peripheral walls respectively and upwardly disposed in three of four peripheral sides thereof for abutting against said friction blocks of said top cover shell, and an opening defined in the other peripheral side thereof corresponding to the opening of said top cover shell.

3. The hard disk drive case mounting structure as claimed in claim 1, wherein said top cover shell further comprises an opening defined in one of our vertical peripheral sides thereof, and three vertical peripheral walls respectively and downwardly disposed in the other three peripheral sides thereof; said bottom holder shell comprises three vertical peripheral walls respectively and upwardly disposed in three of four peripheral sides thereof, a plurality of friction blocks respectively located at an outer surface of each of said three vertical peripheral walls of said bottom holder shell for abutting against an inner surface of each of said three vertical peripheral walls of said top cover shell, and an opening defined in the other peripheral side thereof corresponding to the opening of said top cover shell.

4. The hard disk drive case mounting structure as claimed in claim 1, wherein said electronic system comprises a flat frame member and a plurality of data memories mounted at opposing top and bottom sides of said flat frame member; said mounting through holes of said electronic system are symmetrically formed in said flat frame member near two opposite lateral sides thereof.

5. The hard disk drive case mounting structure as claimed in claim 1, wherein said retaining shank of said male fastening component of each said fastener comprises a tapered guide tip axially located at a distal end thereof opposite to said flat circular shoulder and said flat circular head, and an annular retaining groove extending around the periphery thereof.

6. The hard disk drive case mounting structure as claimed in claim 1, wherein said female fastening component of each said fastener further comprises a hook block perpendicularly extended from each said springy socket wall element and suspending in said engagement hole.

7. The hard disk drive case mounting structure as claimed in claim 1, wherein said retaining shank of said male fastening component of each said fastener comprises a tapered guide tip axially located at a distal end thereof opposite to said flat circular shoulder and said flat circular head, and a plurality of hook blocks disposed around the periphery thereof; said female fastening component of each said fastener further comprises an annular retaining groove located at an inner side of said split tube-like mating connection socket for engagement with said hook blocks.

\* \* \* \* \*